May 28, 1963 D. D. DE REES ETAL 3,091,128
WINDSHIELD WIPER MECHANISM
Filed June 12, 1961 5 Sheets-Sheet 3

INVENTORS
Delbert D. DeRees
Robert M. Fox
BY
W. E. Finken
THEIR ATTORNEY

May 28, 1963   D. D. DE REES ETAL   3,091,128
WINDSHIELD WIPER MECHANISM
Filed June 12, 1961   5 Sheets-Sheet 4

INVENTORS
Delbert D. DeRees
Robert M. Fox
BY
W. E. Finken
THEIR ATTORNEY

May 28, 1963  D. D. DE REES ETAL  3,091,128
WINDSHIELD WIPER MECHANISM
Filed June 12, 1961  5 Sheets-Sheet 5

INVENTORS
Delbert D. DeRees
Robert M. Fox
BY
W. E. Finken
THEIR ATTORNEY

# United States Patent Office 3,091,128
Patented May 28, 1963

3,091,128
WINDSHIELD WIPER MECHANISM
Delbert D. De Rees, Lake Orion, and Robert M. Fox, Detroit, Mich., assignors to General Motors Corporation, Detroit, Mich., a corporation of Delaware
Filed June 12, 1961, Ser. No. 116,602
13 Claims. (Cl. 74—75)

This invention pertains to windshield wiper mechanism of the electric motor driven type, and particularly to mechanism for oscillating a pair of wiper blades throughout running strokes and automatically moving the blades to depressed parked positions.

Heretofore, numerous electric motor driven windshield wiper mechanisms have been designed for oscillating a pair of wiper blades, either in tandem or in phase opposition, embodying means for moving the wiper blades to depressed parked positions against the cowl of the vehicle when operation is discontinued. This invention relates to an improved mechanism of the aforesaid type wherein the throw of a unidirectional rotary crank is varied by eccentric means which are controlled by an electromagnet. In addition, the windshield wiper motor can be used to actuate an intermittent squirt windshield washer pump through an interruptible driving connection so as to provide a complete windshield cleaning system for motor vehicles.

Accordingly, among our objects are the provision of windshield wiper actuating mechanism including a unidirectional rotary crank and means for varying the throw of the crank; the further provision of wiper actuating mechanism driven by an electric motor including electromagnetic means for controlling the throw of a rotary crank; and the still further provision of windshield wiper actuating mechanism driven by an electric motor including means for automatically deenergizing the motor when the throw of the crank is a maximum.

The aforementioned and other objects are accomplished in the present invention by utilizing eccentric means to vary the throw of the crank due to relative rotation between the eccentric means and the crank under the control of an electromagnetically actuated latch. Specifically, the windshield wiper means includes a unidirectional electric motor which is drivingly connected to a worm gear constituting a driving member. The worm gear is journalled on a sleeve having an eccentric through bore within which a crank shaft is journalled. The crank shaft has a single ended crank arm attached to its outer end constituting a driven member, and a drive arm attached to its inner end having a pin disposed in a radial slot of the worm gear such that the crank shaft rotates with the worm gear at all times.

The sleeve is journalled in a housing and has a pair of diametrically opposed transversely extending peripheral slots for receiving a slide adapted for radial movement relative to the sleeve and the worm gear. The slide is thus capable of rotating the sleeve, and is normally connected to rotate with the worm gear by a spring biased link, or pawl. When the slide, and hence the sleeve, rotates with the worm gear and the driven crank shaft, the throw of the single ended crank arc, or driven member, remains fixed, or constant, during rotation thereof. The crank arm is connected by suitable linkage means to a pair of spaced pivot shafts for oscillating a pair of wiper blades throughout their normal running strokes between predetermined inboard and outboard stroke end limits.

An electromagnet including a core and armature is mounted in the housing adjacent the worm gear for uncoupling, or disconnecting, the driving connection between the worm gear and the slide by disengaging the drive pawl from the slide. When the electromagnet is energized the armature is withdrawn from the path of movement of both the drive pawl and the slide. When the electromagnet is deenergized, the armature is biased so as to first engage the drive pawl thereby interrupting the driving connection between the worm gear and the slide, and thereafter engage the slide so as to arrest rotation of the slide and sleeve during continued rotation of the worm gear and crank shaft. This relative rotation between the crank shaft and the sleeve results in increasing the throw of the crank due to the eccentric bore of the sleeve, and when the throw of the crank reaches a maximum the motor is automatically deenergized by a cam actuated parking switch. Thus, the wiper blades are moved beyond their inboard stroke end limits to depressed parked positions, against the cowl of the vehicle.

Further objects and advantages of the present invention will be apparent from the following description, reference being had to the accompanying drawings wherein similar numerals depict similar parts throughout the several views, and wherein preferred embodiments of the present invention are clearly shown.

In the drawings:

FIGURE 4 is a sectional view taken along line 4—4 of FIGURE 3.

FIGURE 5 is a schematic wiring diagram of the wiper motor.

Figure 1:
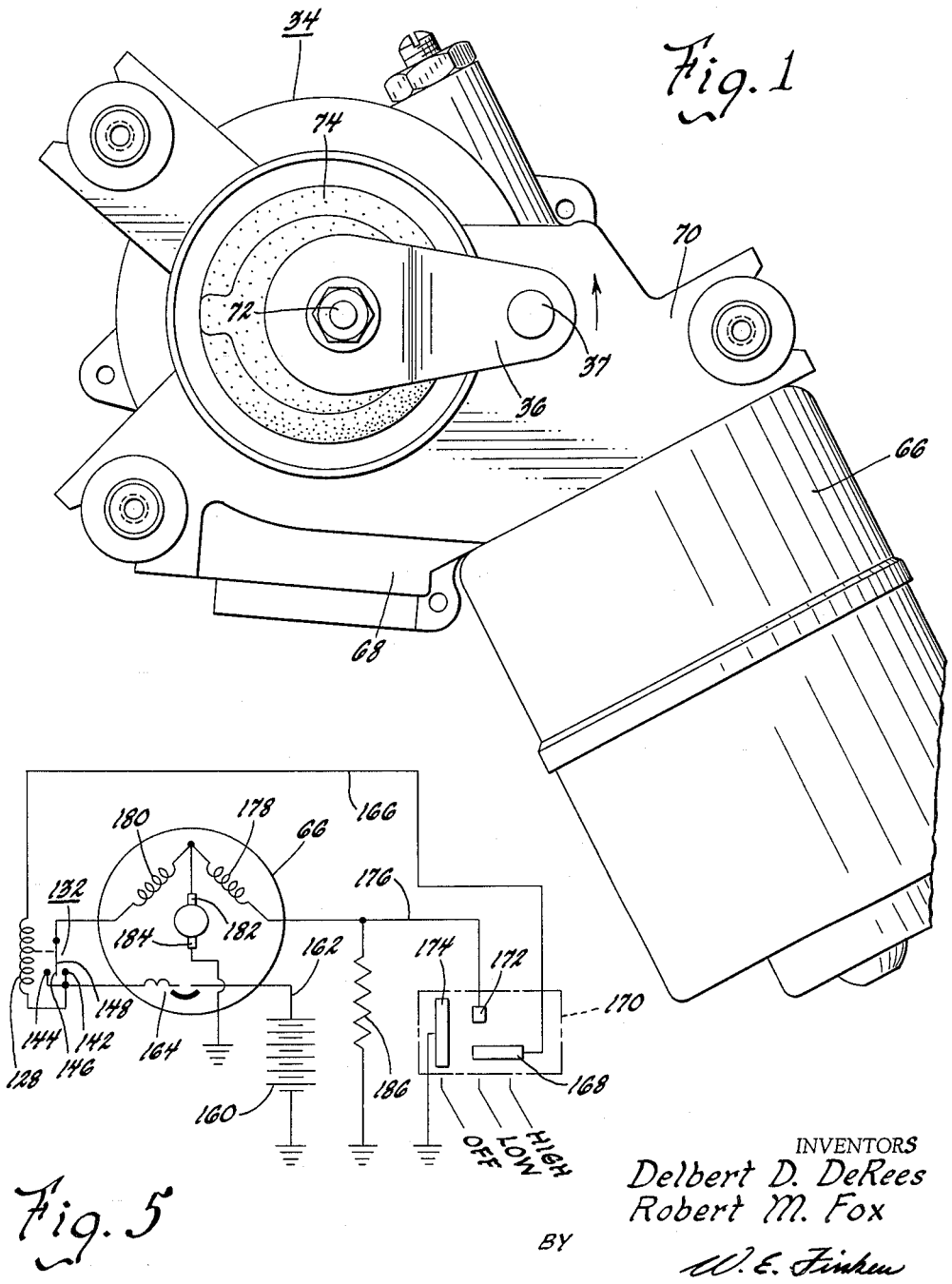
FIGURE 1 is a top view in elevation, of the windshield wiper motor assembly.
Figure 3:
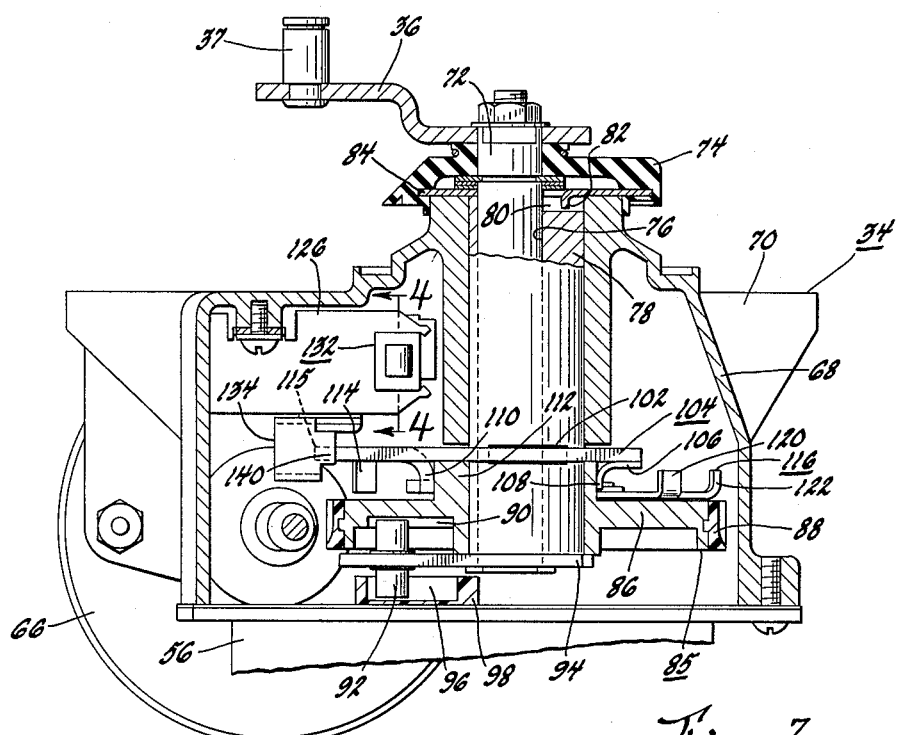
FIGURE 3 is a sectional view taken along line 3—3 of FIGURE 2.

With reference to FIGURE 1, the windshield wiper motor assembly 34 comprises a unidirectional electric motor 66, the frame of which is suitably attached to a gear housing 68 having an integral mounting bracket 70. The crank arm 36 carries a crank pin 37 adjacent its outer end and is rigidly connected to a shaft 72. As seen in FIGURE 3, the shaft 72 extends through a seal cap 74 which closes the shaft opening in the housing 68. The shaft 72 is journalled in an eccentric bore 76 of a sleeve 78, the sleeve 78 being journalled within the housing 68. The sleeve 78 has a radial notch 80 in its upper end that receives a tang 82 on a shield 84 which is interlocked with the seal cap 74 such that rotation of the sleeve 78 imparts rotation to the shield 84 and the seal cap 74.

A worm gear assembly 85 is journalled on the inner end of the sleeve 78, the worm gear assembly being coaxial with the sleeve 78 and including a metallic insert 86 and a nylon toothed rim 88. The metallic insert 86 is formed with an elongated radial slot 90 which receives one end of a drive pin 92 attached to a drive arm 94 rigidly connected to the inner end of the shaft 72. The other end of the drive pin 92 is disposed in an elongated radial slot 96 of the rotatable member 98 for actuating the washer pump 56 in timed relation with the wiper motor.

The electric motor 66 has an integral worm 100 formed on its armature shaft, the worm 100 meshing with the toothed rim 88 of the worm gear assembly 85 whereby rotation of the armature shaft will impart rotation to the worm gear assembly 85 which, in turn, will be imparted through the drive arm 94 to the crank shaft 72 and the crank arm 36. The sleeve 78 has a pair of diametrically located transversely extending slots 102 which receive the spaced legs of a slide 104. A plate 106 is fastened to the legs of the slide 104 and closes the outer ends thereof after assembly with the sleeve 78, the plate 106 having a down turned tang portion 108. The slide 104 has a second down turned tang portion 110, the tang portions 108 and 110 constituting followers which engage a cam 112 integral with the hub of insert 86 on the worm gear assembly 85. The slide 104 also includes a drive flange 114 whereby it can be drivingly connected to the worm gear assembly 85 as will be pointed out more particularly hereinafter. In addition, the slide 104 is formed with a stop lug 115.

Figure 2:
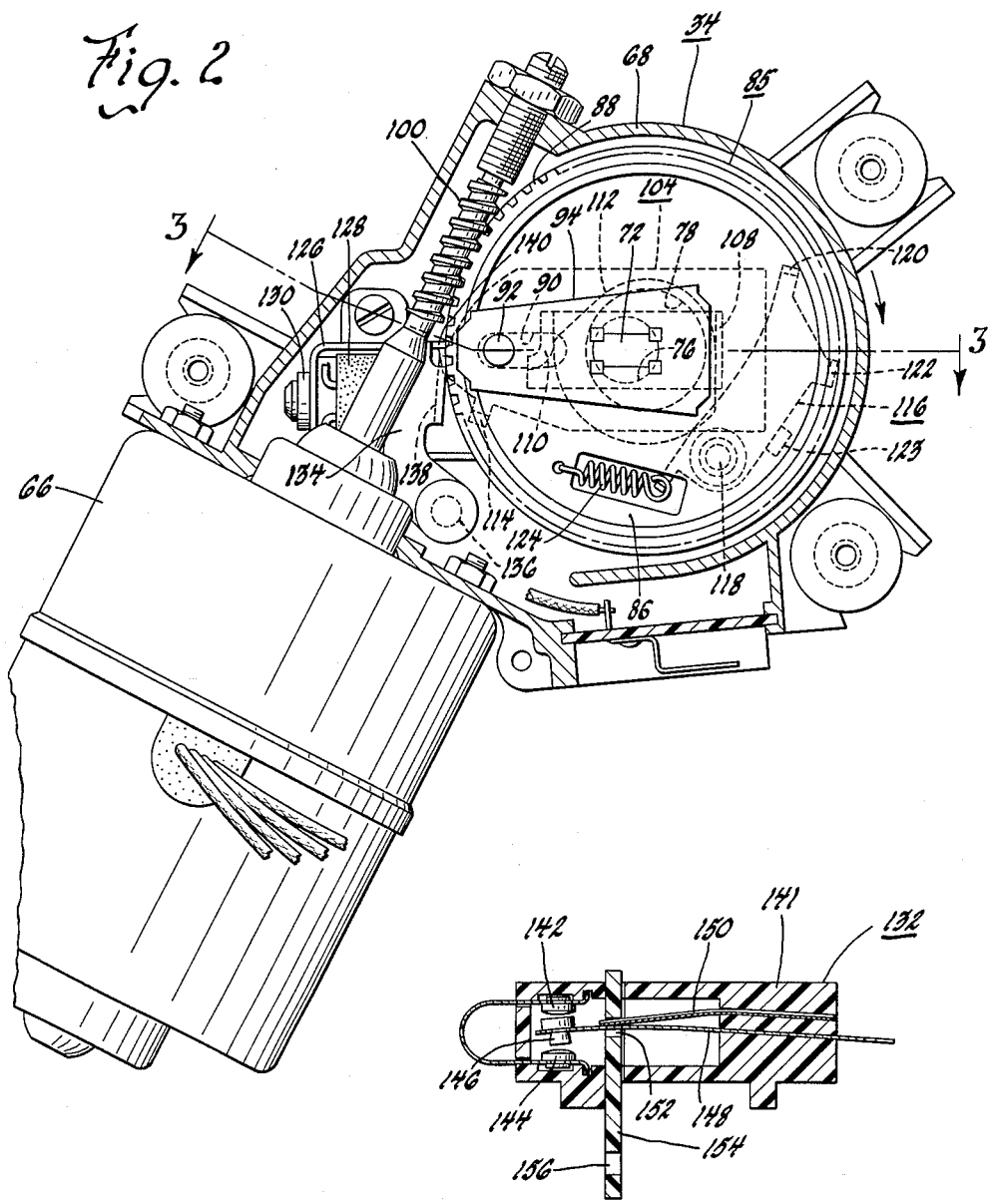
FIGURE 2 is a bottom view, partly in section and partly in elevation, of the windshield wiper motor assembly.

As seen particularly in FIGURES 2 and 3, a drive pawl 116 is mounted on a pivot pin 118 extending upwardly from the back side of the insert 86. The drive pawl 116 has a driving flange 120 and a cam flange 122, and is biased in the clockwise direction (FIGURE 2) about the pivot 118 against a stop lug 123 on the insert 86 by a spring 124. During normal running operation the drive pawl 116 is interlocked with the slide 104 by interengagement of flanges 120 and 114, whereby rotation of the worm gear assembly 85 imparts rotation to the sleeve 78 such that the shaft 72 rotates about the axis of the sleeve 78.

With reference to FIGURES 2 and 3, the electromagnetic control means is disposed within the housing 68 and comprises a U-shaped frame 126 which supports a coil 128 and a core 130 constituting an electromagnet. A parking switch assembly 132 is also supported by the frame 126. An armature 134 is supported on a pivot pin 136 carried by the frame 126, the armature 134 including a flange portion 138 adapted for engagement with the core 130 of the electromagnet and an offset latch portion 140 which is engageable with the cam flange 116 of the drive pawl and the stop lug 115 of the slide 104.

The parking switch comprises a housing 141 of insulating material having a pair of spaced stationary contacts 142 and 144 and a movable contact 146 disposed therebetween. The movable contact 146 is carried by a contact strip 148. A leaf spring 150 is disposed within the housing 141. The leaf spring 150 and the strip 148 extend through a slot 152 in a reciprocable switch actuating plunger 154, having a second slot 156 for receiving the end of the flange 138 on the armature 134. The leaf spring 150 thus biases the plunger 154 and the armature 134 as will be pointed out more particularly hereinafter.

With reference to FIGURE 5, the energizing circuit for the motor 66 and the electromagnetic control means includes a battery 160, one terminal of which is grounded, the other terminal being connected to a wire 162. An automatic reset type thermal overload circuit breaker 164 is connected between the wire 162 and the stationary contacts 142 and 144 of the parking switch assembly 132. The contacts 142 and 144 are connected to one end of the electromagnet coil 128, and the other end of the coil 128 is connected by wire 166 to a stationary contact 168 of a manual control switch 170. The manual control switch 170 includes a second stationary contact 172 and a movable bridging contact 174 which is connected to ground. The stationary contact 172 is connected by wire 176 to the shunt field winding 178 of the motor 66, and the switch blade 148 carrying the movable contact 146 is connected to one end of the series field winding 180 of the motor. The inner ends of the field windings 178 and 180 are connected to a commutator engaging brush 182, the other brush 184 being connected to ground. A speed controlling resistor 186 is connected between the wire 176 and ground.

When the movable bridging contact 174 is moved from the "off" position to either the "low" or "high" speed positions, a circuit is completed from the battery 160 through the electromagnet coil 128 whereupon the armature of the electromagnet will move the blade 148 so that contact 146 engages contact 144. When contact 146 engages contact 144 the energizing circuit for the motor 66 is completed whereupon the motor will rotate at low speed if the resistor 186 is short-circuited as when the bridging contact 174 interconnects stationary contacts 168 and 172, or at high speed when the bridging contact 174 engages only stationary contact 168. When the bridging contact 174 is thereafter moved to the "off" position, the electromagnet coil 128 will be deenergized. The motor 66 will be momentarily deenergized by separation of contacts 146 and 144, and then reenergized since the switch blade 148 is moved by spring 150 so that movable contact 146 engages stationary contact 142. When the wiper blades arrive at their depressed parked position, the switch blade 148 is moved to an intermediate position where the movable contact 146 is disengaged from both contacts 142 and 144 thereby deenergizing the motor.

Figure 12:
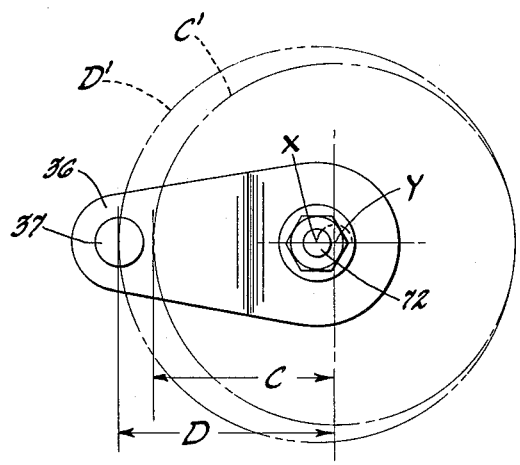
FIGURE 12 is a diagrammatic view showing the manner in which the throw of the crank is varied during operation of the wiper mechanism.

With reference to FIGURE 12, the axis of the shaft 72 is depicted by X and the axis of the sleeve 78 is depicted by Y. During normal running operation the shaft 72 rotates about the axis Y of the sleeve 78, and during such rotation the throw of the crank 36, that is the radial distance between the center of the crank pin 37 and the axis Y of the sleeve 78, remains a constant length denoted C. Accordingly, the center of the crank pin 37 will describe a circle C' having its center at Y. As the mechanism goes into and out of the parking position, the shaft 72 is rotated about its own axis X and thus describes a circle D', the throw of the crank 36 being increased to the length D measured from the axis Y of the sleeve 78 at its maximum throw position whereat the wiper blades are moved to their depressed parked positions and the motor is denergized. The crank arm 36 is shown in the parked position in FIGURES 1, 3 and 12.

*Operation*

Figure 6:
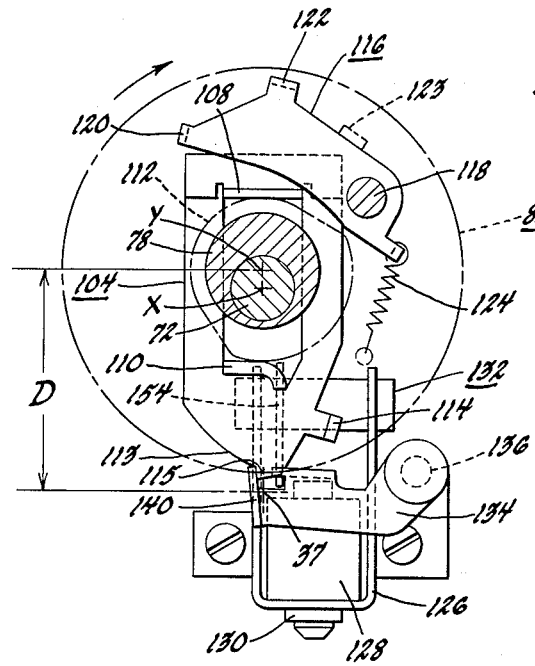
FIGURES 6 through 11 are fragmentary views, partly in section and partly in elevation, depicting various relative positions of the driving mechanism from the "off" or "parked" position through a complete cycle of operation.
Figure 8:
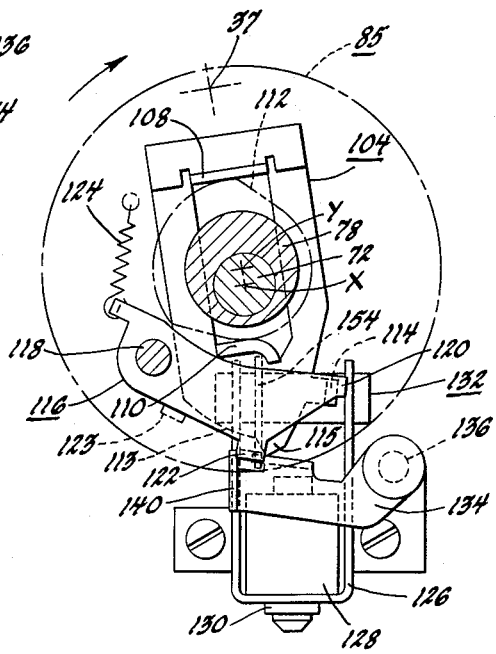
Figure 7:
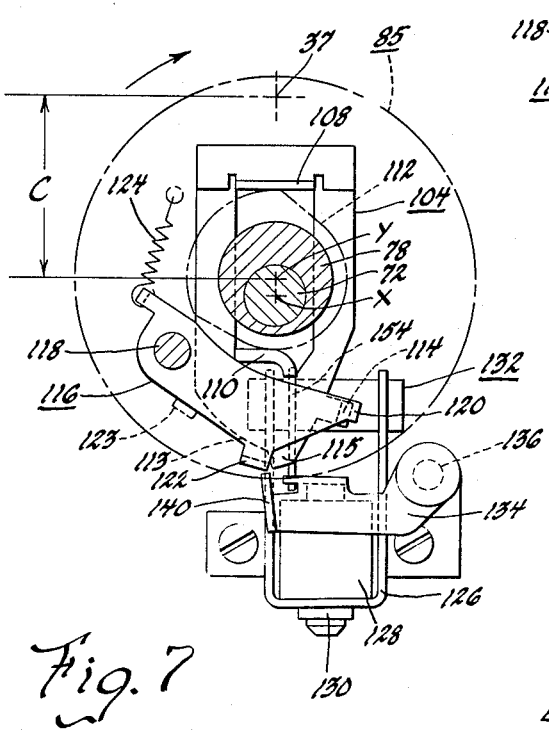

A complete cycle of operation will be described starting from the parked position of the wiper blades and the crank arm 36 with reference to FIGURES 6 through 11. In the parked position of the mechanism the slide 104 is uncoupled from the drive pawl 116 as shown in FIGURE 6. The stop lug 115 is in firm engagement with the offset latch 140 of the armature 134 as is the cam portion 113 of the slide 104 thereby holding the armature 134 in an intermediate position wherein the movable contact 146 of the parking switch assembly 132 is disengaged from both stationary contacts 142 and 144.

When the electromagnet coil 128 is energized by operation of the manual switch 170, the flange portion 130 of the armature 134 is pivoted in a counterclockwise direction, as viewed in FIGURE 6, into firm engagement with the top of the core 130 of the electromagnet. The stop lug 115 on the slide 104 remains engaged with the latch portion 140 of the armature 134. Counterclockwise movement of the armature 134 into firm engagement with the core 130 actuates the switch plunger 154 of the parking switch assembly 132 and moves the contact 146 into engagement with the stationary contact 144 so as to energize the motor 66. This will cause rotation of the worm gear assembly 85 and with it the drive pawl 116 as well as rotation of the crank shaft 72 about its own axis X. Since the cam 112 is integral with the worm gear assembly 85 during clockwise rotation thereof as viewed in FIGURE 6, the slide will be cammed upwardly to the position of FIGURE 7 during 180° rotation of the worm gear assembly relative to the slide whereat the drive flange 120 of the drive pawl 116 will engage the drive flange 114 on the slide. During upward movement of the slide 104 from the position of FIGURE 6 to the position of FIGURE 7, the stop lug 115 is disengaged from the latch portion 140 of the armature 134. Moreover, during this 180° rotation of the crank pin 37 rotating about the axis X of the shaft 72 has returned to the radius C so that during rotation of the slide 104 with the worm gear assembly 85 the crank pin 37 will describe the circle C' as shown in FIGURE 12.

During the running operation the drive pawl 116 remains interlocked, or interconnected, with the slide 104 whereby the sleeve 78 is driven by the slide 104 and the shaft 72 rotates about the axis Y of the sleeve 78. The operator can select either high or low speed operation by manipulation of the manual switch 170.

Figure 9:
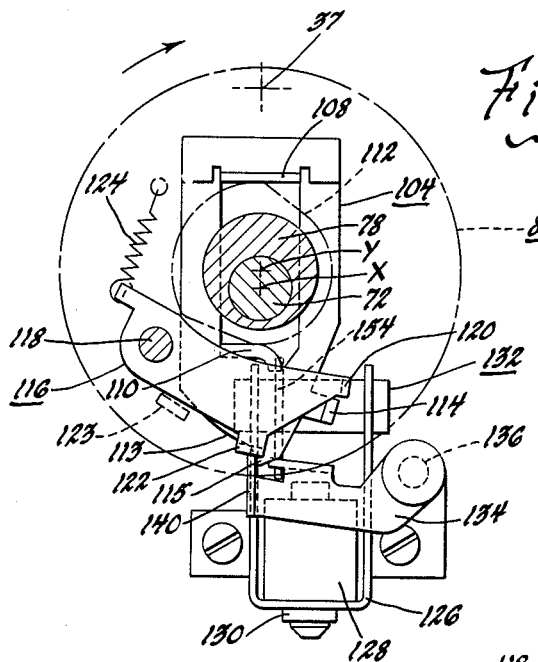
Figure 11:
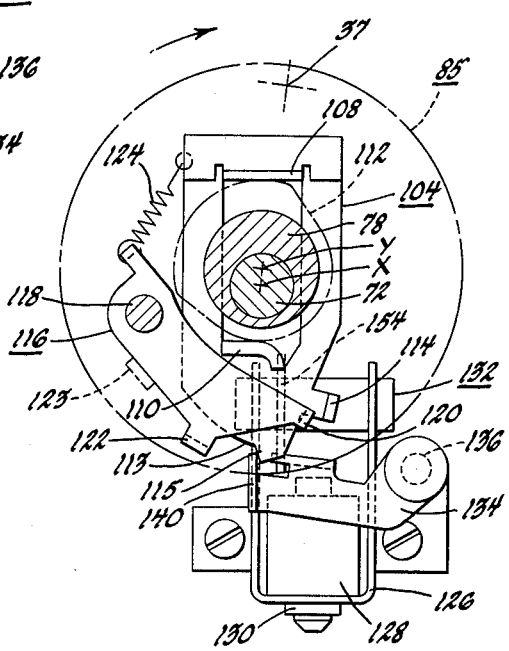
Figure 10:
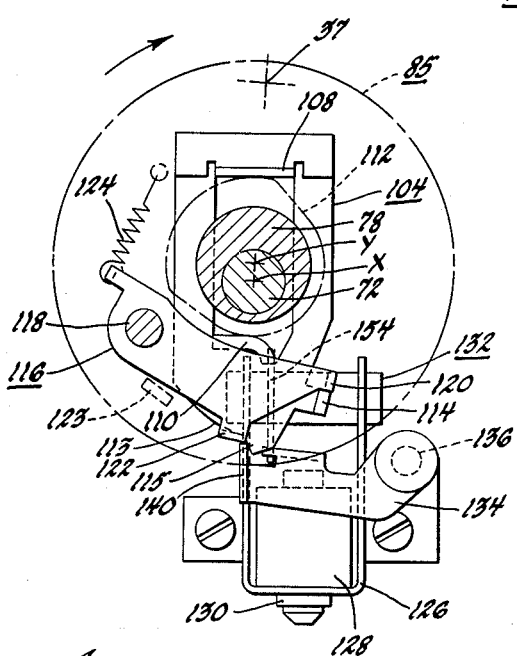

When it is desired to discontinue operation of the wipers, the manual switch 170 is moved to the "off" position thereby deenergizing the electromagnet coil 128. The motor is only momentarily deenergized since the spring 150 moves the armature 134 in a clockwise direction from the position of FIGURE 7 to the position of FIGURE 8 and engages movable contact 146 on the parking switch assembly with stationary contact 142. This clockwise movement of the armature 134 positions the latch 140 in the path of movement of the cam flange 122 of the drive pawl 116 so that when the cam flange 122 arrives at the position of FIGURE 8 it will engage the latch 140 of the armature such that during continued rotation of the worm gear assembly, it will pivot in the counterclockwise direction about its pivot pin 118 thereby stressing the spring 124, as seen in sequence in FIGURES 8, 9, 10 and 11, thereby disengaging the drive flange 120 from the drive flange 114 of the slide 104. In FIGURE 9 the drive pawl 116 has been cammed so that the drive flange 120 is disengaged from drive flange 114 of the slide 104. At the same time, the stop lug 115 on the slide 104 engages the latch 140 of the armature thereby arresting rotation of the slide 104. During continued rotation of the worm gear assembly from the position of FIGURE 9 to the position of FIGURE 10, the drive lug 120 on the pawl 116 passes over the drive flange 114 on the slide 104. During further continued rotation of the worm gear assembly from the position of FIGURE 10 to the position of FIGURE 11, the drive pawl 116 is completely uncoupled, or disconnected, from the slide 104 while the slide 104 remains stationary by virtue of engagement of stop lug 115 with the latch 140. Thereafter, during continued rotation of the worm gear assembly and the shaft 72 about its own axis Y from the position of FIGURE 11 to the position of FIGURE 6, the cam 112 moves the slide 104 radially so that the cam surface 113 engages the latch 140 and imparts counterclockwise movement to the armature 134, and simultaneously the throw of the crank 37 is increased so that when the crank 37 reaches the position shown in FIGURE 12 the wiper blades will be at their depressed parked position and the motor 66 will be deenergized by disengaging movable contact 146 from stationary contact 142 due to counterclockwise pivotal movement of the armature 134 by the cam surface 113 on the slide 104.

While the embodiments of the invention as herein disclosed constitute preferred forms, it is to be understood that other forms might be adopted.

What is claimed is as follows:

1. Windshield wiper actuating mechanism including, a sleeve having an eccentric through bore, means rotatably journalling said sleeve for rotation about its axis, a rotatable driving member journalled on said sleeve and coaxial therewith, a shaft journalled within the eccentric through bore of said sleeve, means drivingly connected said shaft and said driving member, crank means connected to said shaft for rotation therewith, means constituting an interruptible driving connection between said sleeve and driving member whereby rotation of said driving member will rotate said sleeve to rotate said shaft and crank means about the axis of said sleeve, and means operable to interrupt the driving connection between said driving member and said sleeve and simultaneously arrest rotation of said sleeve whereby continued rotation of said driving member will effect rotation of said shaft about its own axis to vary the throw of said crank means.

2. Windshield wiper actuating mechanism including, a rotatable sleeve having an eccentric through bore, means rotatably journalling said sleeve for rotation about its axis, a driving member journalled on said sleeve and coaxial therewith, a shaft rotatably journalled within said eccentric through bore and carrying crank means, means drivingly interconnecting said shaft and said driving member for rotation in unison, spring biased means interconnecting said drive member and said sleeve constituting an interruptible driving connection therebetween whereby said shaft will rotate about the axis of said sleeve, and means operable to interrupt the driving connection between said driving member and said sleeve and simultaneously arrest rotation of said sleeve whereby continued rotation of said driving member effects rotation of said shaft about its own axis to vary the throw of the crank means.

3. Windshield wiper actuating mechanism including, a rotatable sleeve having an eccentric through bore, means journalling said sleeve for rotation about its own axis, a driving member rotatably journalled on said sleeve and coaxial therewith, a shaft journalled in the eccentric through bore of said sleeve and carrying crank means, means drivingly interconnecting said shaft and said driving member for rotation in unison, a slide member restrained against rotation relative to said sleeve, means carried by said driving member and engageable with said slide member to establish an interruptible driving connection between said driving member and said slide member whereby said sleeve will rotate with said driving member and said shaft will rotate about the axis of said sleeve, and means operable to interrupt the driving connection between said member and said driving member and simultaneously arrest rotation thereof whereby continued rotation of said driving member will rotate said shaft about its own axis to vary the throw of the said crank means.

4. Windshield wiper actuating mechanism including, a rotatable sleeve having an eccentric through bore, means journalling said sleeve for rotation about its axis, a driving member journalled on said sleeve, a shaft journalled in the eccentric through bore of said sleeve and having crank means, means interconnecting said driving member and said shaft for rotation in unison, a slide member restrained against rotation relative to said sleeve, a drive pawl pivotally attached to said driving member and engageable with said slide member for imparting rotation thereto and constituting an interruptible driving connection between said driving member and said sleeve which, when engaged, results in rotation of said shaft about the axis of said sleeve, and means operable to disengage the drive pawl and said slide member and simultaneously arrest rotation of said slide member and said sleeve whereby continued rotation of said driving member effects rotation of said shaft about its own axis to vary the throw of said crank means.

5. Windshield wiper actuating mechanism including, a rotatable sleeve having an eccentric through bore, means journalling said sleeve for rotation about its own axis, a driving member rotatably journalled on said sleeve, a shaft journalled in said eccentric through bore and drivingly connected to said driving member for rotation in unison therewith, a fixed length crank connected to said shaft, a slide member restrained against rotation relative to said sleeve, a drive pawl pivotally attached to said driving member and engageable with said slide member to establish an interruptible driving connection therebetween which, when engaged, results in rotation of said shaft about the axis of said sleeve, and means operable to disengage the drive pawl and said slide member and simultaneously arrest rotation of said slide member whereby continued rotation of said drive member effects rotation of said shaft about its own axis to vary the throw of said crank.

6. The mechanism set forth in claim 5 wherein said sleeve has a pair of transversely extending diametrically opposed notches, and wherein said slide member has a pair of spaced legs disposed in said notches.

7. The mechanism set forth in claim 5 wherein said drive member is formed with an eccentric hub portion, and wherein said sleeve member has a pair of cam follower lugs engaging said eccentric hub portion whereby relative rotation about said driving member and said slide member will effect radial movement of said slide member relative to said sleeve.

8. Windshield wiper actuating and control mechanism including, a rotatable sleeve having an eccentric through bore, means journalling said sleeve for rotation about its axis, a driving member journalled on said sleeve for rotation about the axis thereof, an electric motor connected to said driving member for rotating the same, a source of electrical power, circuit means interconnecting said power source and said motor including a switch, a shaft journalled in the eccentric through bore of said sleeve and connected with said driving member for rotation in unison therewith, crank means carried by said shaft, means interconnecting said sleeve and said driving member and constituting an interruptible driving connection therebetween which, when engaged, effects rotation of said shaft about the axis of said sleeve, means operable to interrupt the driving connection between said sleeve and said driving member and simultaneously arrest rotation of said sleeve whereby continued rotation of said driving member will effect rotation of said shaft about its own axis to vary the throw of said crank means, and switch actuating means for opening said switch when the throw of said crank is substantially a maximum.

9. Windshield wiper actuating and control mechanism including in combination, a rotatable sleeve having an eccentric through bore, means journalling said sleeve for rotation about its axis, a driving member journalled in said sleeve, an electric motor connected to said driving member for imparting rotation thereo, an energizing circuit for said motor including a switch, a shaft journalled in the eccentric through bore of said sleeve and connected to said driving member for rotation therewith, a crank connected to said shaft, a slide member restrained against rotation relative to said sleeve but capable of radial movement relative thereto, means carried by said driving member and engageable with said slide member for establishing an interruptible driving connection therebetween which, when engaged, effects rotation of said shaft about the axis of said sleeve, means operable to interrupt the driving connection between said driving member and said slide member and simultaneously arrest rotation of said slide member and said sleeve whereby continued rotation of said driving member effects rotation of said shaft about its own axis to vary the throw of said crank, and switch actuating means for opening said switch to deenergize said motor when the throw of the crank is substantially a maximum.

10. The mechanism set forth in claim 9 wherein the means for establishing an interruptible driving connection between said driving member and said slide member comprises a spring biased drive pawl pivotally mounted on said driving member and engageable with said slide member.

11. The mechanism set forth in claim 9 wherein said switch comprises a pair of spaced stationary contacts and an intermediate movable contact, a plunger connected to said movable contact, a spring engaging said plunger and normally biasing the same to a position where said movable contact engages one of said stationary contacts, and wherein said mechanism includes an electromagnet including a pivotally mounted armature connected to said switch actuating plunger, said electromagnet, when energized, attracting said armature to move said movable switch contact into engagement with the other stationary contact, and wherein said switch actuating means includes said slide member for moving said armature and said switch actuating plunger to an intermediate position to deenergize said motor.

12. The mechanism set forth in claim 9 wherein said driving member includes a cam portion, wherein said slide member includes a pair of cam followers engageable with said cam portion and wherein relative rotation between said driving member and said sleeve effects radial movement of said slide member.

13. The mechanism set forth in claim 11 wherein said armature constitutes the means for interrupting the driving connection between said slide member and said driving member upon deenergization of said electromagnet.

References Cited in the file of this patent

UNITED STATES PATENTS 2,985,024     Constant _____ May 23, 1961
3,025,554     Ziegler _____ Mar. 20, 1962